(12) United States Patent
Maruya

(10) Patent No.: US 8,097,182 B2
(45) Date of Patent: Jan. 17, 2012

(54) HYDROCARBON REFRIGERANT AND DETERGENT COMPOSITION

(75) Inventor: Richard H. Maruya, Kaneohe, HI (US)

(73) Assignee: A.S. Trust & Holdings, Inc., Saipan (MP)

( * ) Notice: Subject to any disclaimer, the term of this patent is extended or adjusted under 35 U.S.C. 154(b) by 60 days.

(21) Appl. No.: 12/457,629

(22) Filed: Jun. 17, 2009

(65) Prior Publication Data

US 2010/0320413 A1  Dec. 23, 2010

(51) Int. Cl.
C09K 5/04 (2006.01)

(52) U.S. Cl. ......................................................... 252/67

(58) Field of Classification Search ....................... 252/67
See application file for complete search history.

(56) References Cited

U.S. PATENT DOCUMENTS

| | | | |
|---|---|---|---|
| 4,183,225 A | | 1/1980 | Politte et al. |
| 4,981,766 A | * | 1/1991 | Aoike et al. ................. 430/57.6 |
| 5,714,083 A | | 2/1998 | Turner |
| 5,755,115 A | | 5/1998 | Manley |
| 6,231,782 B1 | | 5/2001 | Shimomura et al. |
| 6,692,654 B2 | | 2/2004 | Osumi et al. |
| 6,742,357 B1 | | 6/2004 | Roberts |
| 6,902,686 B2 | | 6/2005 | Maruya |
| 6,936,576 B2 | | 8/2005 | Ohsumi et al. |
| 7,045,490 B2 | | 5/2006 | Shimomura et al. |
| 7,071,236 B2 | | 7/2006 | Fischer et al. |
| 7,237,407 B2 | | 7/2007 | Paradowski |
| 2002/0123436 A1 | | 9/2002 | Osumi et al. |
| 2004/0182108 A1 | | 9/2004 | Roberts |
| 2005/0051756 A1 | | 3/2005 | Maruya |
| 2006/0120891 A1 | * | 6/2006 | Jung et al. ..................... 417/366 |
| 2007/0164252 A1 | | 7/2007 | Tokiai |
| 2007/0257229 A1 | | 11/2007 | Tagawa et al. |

FOREIGN PATENT DOCUMENTS

| | | |
|---|---|---|
| EP | 1 514 915 A1 | 3/2005 |
| JP | 7300579 | 11/1995 |
| JP | 2004035701 | 2/2004 |
| WO | WO 94/00529 | 1/1994 |
| WO | WO 97/20902 | 6/1997 |

* cited by examiner

*Primary Examiner* — John Hardee
(74) *Attorney, Agent, or Firm* — Richard T. Litman

(57) ABSTRACT

The hydrocarbon refrigerant and detergent composition is a hydrocarbon-based composition, which may be used as a refrigerant for air conditioners, refrigerators or the like, and which may also be used as a detergent for cleaning precision components, such as semiconductor chips, motherboards or the like. The hydrocarbon composition includes about 5.0% ethane, about 60.0% propane, about 5.0% isobutene and about 30.0% butane by volume.

6 Claims, No Drawings

HYDROCARBON REFRIGERANT AND DETERGENT COMPOSITION

BACKGROUND OF THE INVENTION

1. Field of the Invention

This present invention relates to hydrocarbon compositions. Particularly, the present invention relates to hydrocarbon compositions used as refrigerants for air conditioners, refrigerators or the like, and further which may be used as a detergent for cleaning precision components, such as semiconductor chips, motherboards or the like.

2. Description of the Related Art

Chlorofluorocarbons (CFC), such as dichlorodifluoromethane and monochlorodifluoromethane, for example, have been used as refrigerants for air conditioners, refrigerators and the like. Such compositions have also been used for the dual function of cleaning or washing precision components, such as semiconductor chips and the like. CFCs have been used due to their relatively safe incombustibility, high stability, and low toxicity. However, CFCs are known to aid in the depletion of the Earth's ozone layer, thus exerting a dangerous influence upon the global environment. Due to this reason, the production and use of CFCs have been gradually reduced, and few CFCs are in use today.

A wide variety of alternatives for chlorofluorocarbons have been introduced as refrigerants and detergents. Hydrofluorocarbons (HFCs), for example, such as 1,1,1,2-tetrafluoroethane and 1,1,1-trifloroethane are presently being utilized as replacements for CFCs. HFCs, however, also cause degradation of the ozone layer, though to a lesser extent. Further, HFCs act as greenhouse gases, contributing to global warming.

Hydrocarbon mixtures are presently being explored as replacements for CFCs and HFCs, due to their relatively benign effect on the environment. Conventional hydrocarbon compositions are generally used in combination with CFCs, HFCs or the like and, therefore, still provide some level of environmental hazard. Thus, a need exists for hydrocarbon compositions capable of being independently used as a refrigerant.

One prior hydrocarbon refrigerant composition consists solely of a mixture of propane and butane. However, such a composition tends to decompose into its individual components (i.e., propane and butane) when leaking outside a cooling system or other apparatus. As a result, the refrigerant left in the cooling system may also break down, requiring full replacement of the refrigerant, and possibly damaging the cooling apparatus.

Further, such a refrigerant has a low ignition temperature, on the order of 400° C. Thus, the usage of such a composition presents a safety hazard to those around the cooling apparatus.

Thus, a hydrocarbon refrigerant and detergent composition solving the aforementioned problems is desired.

SUMMARY OF THE INVENTION

The hydrocarbon refrigerant and detergent composition is a hydrocarbon-based composition which may be used as a refrigerant for air conditioners, refrigerators or the like, and further which may be used as a detergent for cleaning precision components, such as semiconductor chips, motherboards or the like. The hydrocarbon composition includes about 5.0% ethane, about 60.0% propane, about 5.0% isobutene and about 30.0% butane by volume.

These and other features of the present invention will become readily apparent upon further review of the following specification.

DETAILED DESCRIPTION OF THE PREFERRED EMBODIMENTS

The present invention relates to hydrocarbon compositions, which may be used as a refrigerant or a detergent. The hydrocarbon composition includes ethane, propane, isobutene and butane in combination. The hydrocarbon composition may be used as a refrigerant having a relatively high ignition temperature with minimal environmental impact. The hydrocarbon composition may further be used as a detergent, cleaner or the like for high precision and delicate electronic components, such as semiconductor chips, motherboards and the like.

The hydrocarbon composition preferably includes about 5.0% ethane, 60.0% propane, 5.0% isobutene and 30.0% butane by volume. It should be understood that this preferred composition may include variations in the volume concentrations of each component by as much as 20%.

The hydrocarbon composition having approximately 5.0% ethane, 60.0% propane, 5.0% isobutene and 30.0% butane by volume may be used as a replacement for a conventional refrigerant. For example, 1,1,1,2-tetrafluoroethane, also called tetrafluoroethane, R-134a, Genetron® 134a, Suva® 134a or HFC-134a, is a common haloalkane refrigerant with thermodynamic properties similar to R-12 (dichlorodifluoromethane), but without its ozone depletion potential. It has the formula $CH_2FCF_3$, and a boiling point of −26.3° C. (−15.34° F.). The present hydrocarbon composition may replace R-134a in a refrigerator system, with the present hydrocarbon composition being as effective as R-134a, but in smaller quantities. For example, one fluid ounce of the present hydrocarbon refrigerant would produce the same result as using four fluid ounces of R-134a. Thus, by replacing R-134a with the present hydrocarbon composition, a refrigerator using the present hydrocarbon composition would require less energy to run as efficiently (since the compressor of the refrigeration unit would perform less work on the decreased volume).

Similarly, chlorodifluoromethane or difluoromonochloromethane is a hydrochlorofluorocarbon (HCFC) once commonly used as a propellant and in air conditioning applications. This gas is commonly known as HCFC-22 or R-22. Its usage in these applications is being phased out due to ozone depletion potential and status as a potent greenhouse gas. The present hydrocarbon composition may be used as a replacement for R-22, since it has no ozone depletion potential and no known greenhouse effects. Further, only 35 to 40%, by volume, of the present hydrocarbon composition is needed to replace R-22. As noted above, this requires the refrigerator or air conditioner (or similar apparatus) to use less energy for the same result.

It is to be understood that the present invention is not limited to the embodiments described above, but encompasses any and all embodiments within the scope of the following claims.

I claim:

1. A hydrocarbon composition, comprising about 5.0% ethane, about 60.0% propane, about 5.0% isobutene and about 30.0% butane by volume.

2. A refrigerant composition, comprising the hydrocarbon composition as recited in claim 1.

3. A detergent composition, comprising the hydrocarbon composition as recited in claim 1.

4. A hydrocarbon composition, consisting essentially of about 5.0% ethane, about 60.0% propane, about 5.0% isobutene and about 30.0% butane by volume.

5. A refrigerant composition, comprising the hydrocarbon composition as recited in claim 4.

6. A detergent composition, comprising the hydrocarbon composition as recited in claim 4.

* * * * *